(12) United States Patent
Comeau

(10) Patent No.: US 9,301,227 B2
(45) Date of Patent: *Mar. 29, 2016

(54) AGGREGATION OF CARRIERS OF A CELLULAR RADIO NETWORK WITH CARRIERS OF AN AUXILIARY NETWORK

(71) Applicant: Telefonaktiebolaget LM Ericsson (publ), Stockholm (SE)

(72) Inventor: Adrien Joseph Comeau, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,857

(22) Filed: Feb. 24, 2015

(65) Prior Publication Data

US 2015/0172979 A1   Jun. 18, 2015

Related U.S. Application Data

(63) Continuation of application No. 13/779,169, filed on Feb. 27, 2013, now Pat. No. 8,995,299.

(51) Int. Cl.
*H04W 84/12* (2009.01)
*H04W 36/04* (2009.01)
(Continued)

(52) U.S. Cl.
CPC ............ *H04W 36/04* (2013.01); *H04L 5/0098* (2013.01); *H04W 36/14* (2013.01); *H04W 36/38* (2013.01); *H04W 72/0453* (2013.01); *H04W 88/04* (2013.01); *H04W 4/005* (2013.01); *H04W 36/24* (2013.01); *H04W 88/06* (2013.01); *H04W 88/10* (2013.01)

(58) Field of Classification Search
CPC .......... H04W 72/121; H04W 72/1231; H04W 72/048; H04W 72/0486; H04W 36/14; H04W 28/0205; H04W 4/005; H04W 4/02; H04W 76/025; H04L 5/001–5/0033; H04B 7/2656
USPC .................................................. 370/252–431
See application file for complete search history.

(56) References Cited

U.S. PATENT DOCUMENTS

| 8,995,299 | B2 * | 3/2015 | Comeau ................ H04L 5/0098 370/252 |
| 2011/0058531 | A1 * | 3/2011 | Jain et al. ..................... 370/331 |

(Continued)

OTHER PUBLICATIONS

International Search Report and Written Opinion dated Apr. 23, 2014 for International Application No. PCT/IB2014/058269, International Filing Date: Jan. 14, 2014 consisting of 12-pages.

(Continued)

*Primary Examiner* — Afsar M Qureshi
(74) *Attorney, Agent, or Firm* — Christopher & Weisberg, P.A.

(57) ABSTRACT

A method and devices for integrating a cellular radio network with a WiFi network are disclosed. According to one aspect, a method includes selecting, at a base station having a cellular radio subsystem and a WiFi radio subsystem, at least one of a cellular radio network carrier and a WiFi carrier to carry at least one data flow from the base station to a user equipment. The method further includes transmitting, from the base station to a user equipment, a control signal to cause the user equipment to select at least one of a cellular radio subsystem of the user equipment and a WiFi radio subsystem of the user equipment to receive the selected at least one of the cellular radio network carrier and the WiFi carrier. Data from the at least one data flow is transmitted on the at least one selected carrier.

22 Claims, 8 Drawing Sheets

(51) Int. Cl.
*H04W 36/14* (2009.01)
*H04L 5/00* (2006.01)
*H04W 36/38* (2009.01)
*H04W 72/04* (2009.01)
*H04W 88/04* (2009.01)
*H04W 4/00* (2009.01)
*H04W 88/06* (2009.01)
*H04W 88/10* (2009.01)
*H04W 36/24* (2009.01)

(56) References Cited

U.S. PATENT DOCUMENTS

| | | | |
|---|---|---|---|
| 2011/0263274 A1 | 10/2011 | Fox et al. | |
| 2012/0033621 A1* | 2/2012 | Mueck | 370/329 |
| 2013/0083783 A1* | 4/2013 | Gupta | H04W 4/005 370/338 |
| 2013/0223408 A1* | 8/2013 | Brandt et al. | 370/331 |
| 2013/0229976 A1* | 9/2013 | Srinivasan et al. | 370/315 |
| 2014/0043979 A1 | 2/2014 | Etemad et al. | |
| 2014/0051402 A1* | 2/2014 | Qureshi | H04M 3/5307 455/413 |
| 2014/0112282 A1* | 4/2014 | Wijting et al. | 370/329 |
| 2014/0341109 A1* | 11/2014 | Cartmell | H04L 45/308 370/328 |

OTHER PUBLICATIONS

3GPP TSG-RAN WG2 #81 R2-130331; St. Julian's, Malta, Jan. 28-Feb. 1, 2013, Source: ETRI, Title: "Requirements for WLAN/3GPP Radio Interworking (ETRI)", Agenda Item: 5.1 Document for: Discussion and Decision, vol. RAN WG2, No. St. Julian; 20130128-20130201 Jan. 18, 2013, XP050668066, Retrieved from the Internet: URL: http://www.3gpp.org/ftp/tsg_ran/WG2_RL2/TSGR2_81/Docs [retrieved on Jan. 18, 2013], consisting of 2-pages.

3GPP TSG-RAN WG2 #81 R2-130270; St. Julian's, Malta, Jan. 28-Feb. 1, 2013, Source: New Postcom, Title: "Considerations on Requirements and Scenarios of WLAN/3GPP Radio Interworking", Agenda Item: 5.1 Document for: Discussion and Decision, vol. RAN WG2, No. St. Julian; 20130128-20130201 Jan. 19, 2013, XP050668305, Retrieved from the Internet: URL: http://www.3gpp.org/ftp/tsg_ran/WG2_RL2/TSGR2_81/Docs [retrieved on Jan. 19, 2013], consisting of 4-pages.

3GPP TSG-RAN WG2 #81 R2-130461; St. Julian's, Malta, Jan. 28-Feb. 1, 2013, Source: Ericsson, St-Ericsson, Title: "WLAN-3GPP Radio Interworking Scenarios and Requirements", Agenda Item: 5.1 Document for: Discussion and Decision, vol. RAN WG2, No. St. Julian; 20130128-20130201 Jan. 19, 2013, XP050668371, Retrieved from the Internet: URL: http://www.3gpp.org/ftp/tsg_ran/WG2_RL2/TSGR2_81/Docs [retrieved on Jan. 19, 2013], consisting of 6-pages.

International Preliminary Report on Patentability dated May 18, 2015 for International Application No. PCT/IB2014/058269, International Filing Date: Jan. 14, 2014 consisting of 18-pages.

* cited by examiner

AGGREGATION OF CARRIERS OF A CELLULAR RADIO NETWORK WITH CARRIERS OF AN AUXILIARY NETWORK

CROSS-REFERENCE TO RELATED APPLICATION

This application is a continuation of U.S. patent application Ser. No. 13/779,169, filed Feb. 27, 2013, entitled "AGGREGATION OF CARRIERS OF A CELLULAR RADIO NETWORK WITH CARRIERS OF AN AUXILIARY NETWORK", now U.S. Pat. No. 8,995,299, issued on Mar. 31, 2015, the entirety of which is incorporated herein by reference.

TECHNICAL FIELD

The present invention relates to communication networks, and in particular to aggregation of carriers of a cellular radio network with carriers of an auxiliary network.

BACKGROUND

WiFi, also termed WLAN, has become a ubiquitous wireless technology for data communication in the unlicensed radio spectrum. The Institute of Electrical and Electronic Engineers, IEEE, standard IEEE 802.11 defines the protocol stack and functions used by WiFi access points, APs. In the licensed radio spectrum $3^{rd}$ generation partnership project, long term evolution, 3GPP LTE, wireless communication technology is rapidly being deployed. LTE is the $4^{th}$ generation of wireless cellular communications. The protocol stack of LTE is currently defined by the 3GPP. The rapid increase in cellular data usage has prompted wireless operators to turn to using WiFi as a means to offload traffic from the congested licensed radio spectrum.

WiFi and cellular radio networks have traditionally been implemented and operated separately from one another. For example, FIG. 1 shows a known cellular radio network 10 and a known WiFi network 11. Each of networks 10 and 11 are independent of the other, even though coverage provided by each network 10 and 11 may overlap in some areas. The cellular radio network includes a plurality of base stations 12 that contain radios that communicate over a defined geographic area called a cell. The base stations 12 may be, for example, evolved Node B, eNB, base stations of an evolved Universal Terrestrial Radio Access Network, eUTRAN, or LTE network. The air interface of the base stations 12 may be orthogonal frequency division multiple access, OFDMA, on the downlink, and single carrier frequency division multiple access, SC-OFDMA, on the uplink.

Each base station 12 may be in communication with a serving gateway S-GW 14 using an S1 protocol. The S-GW 14 provides a communication interface between the base stations 12 and the Internet and/or a backhaul network. As such S-GW 14 routes and forwards user data packets, while also acting as the mobility anchor for the user plane during inter-eNB handovers and as the anchor for mobility between LTE and other 3GPP technologies.

The base stations 12 are also in communication with a mobile management entity, MME, 16. The MME 16 is a control node for an LTE access-network. The MME 16 is responsible for idle mode UE 24, User Equipment, tracking and paging procedures. The MME 16 is involved in the bearer activation/deactivation process and is also responsible for choosing the S-GW 14 for a UE 24 at the UE's initial entry into the LTE network and at a time of intra-LTE handover.

The MME 16 is responsible for authenticating the user, for generation and allocation of temporary identities to UEs, for authorization of the UE 24 to camp on the service provider's Public Land Mobile Network (PLMN) and enforces UE roaming restrictions. The MME is the termination point in the network for ciphering/integrity protection for non-access stratum, NAS, signaling and handles security key management. Lawful interception of signaling is also supported by the MME 16. Further, the MME 16 also provides the control plane function for mobility between LTE and second generation/third generation, 2G/3G, access networks.

The WiFi network 11 includes wireless access points 22. Each WiFi access point functions as a communication interface between a user equipment 24, such as a computer, and the Internet. The coverage of one or more (interconnected) access points, called hotspots, can extend from an area as small as a few rooms to as large as many square miles. Coverage in the larger area may require a group of access points with overlapping coverage.

Cellular radio networks, such as the communication network 10, and the WiFi network 11 utilize two independent radio air interfaces and networks, each with their own operations, administration and management, OAM, infrastructure. Since the two network architectures are separated, the ability to perform fast and reliable mobility (handoff) of subscriber data sessions between the two networks is severely limited. For example, seamless roaming from LTE to WiFi and back without loss of data packets is a hugely complex task with today's separate networks.

The vast majority of smartphone devices now manufactured include both 3GPP cellular (3G and 4G) and WiFi capabilities. These user equipments 24 have separate radio and protocol stacks for each technology (termed dual stack or dual radio). Both wireless technologies operate simultaneously and independently. As data usage in a wireless communication system grows, cellular radio operators may seek solutions that take advantage of a WiFi network's capacity, combined with cellular radio's mobility. However, WiFi uses an unlicensed spectrum and its capacity and quality of service, QoS, are subject to change. Further, there is currently no way for a cellular operator to meter traffic pushed to the WiFi network.

SUMMARY

The present invention advantageously provides a method and devices for integrating a cellular radio network with a WiFi network. According to one aspect, a method includes selecting, at a base station having a cellular radio subsystem and a WiFi radio subsystem, at least one of a cellular radio network carrier and a WiFi carrier to carry at least one data flow from the base station to a user equipment. The method further includes transmitting, from the base station to a user equipment, a control signal to cause the user equipment to select at least one of a cellular radio subsystem of the user equipment and a WiFi radio subsystem of the user equipment to receive the selected at least one of the cellular radio network carrier and the WiFi carrier. Data from the at least one data flow is transmitted on the at least one selected carrier.

According to this aspect, in some embodiments, selecting at least one of the cellular radio network carrier and the WiFi carrier is based at least in part on a quality of service, QoS, associated with transmission of data on the WiFi carrier. In some embodiments, selecting at least one of the cellular radio network carrier and the WiFi carrier is based at least in part on a capacity of the WiFi carrier. In some embodiments, selecting at least one of the cellular radio network carrier and the WiFi carrier is based at least in part on a delay tolerance of data to be transmitted on an available one of the cellular radio network carrier and the WiFi carrier. In some embodiments, the method further includes metering, at the base station, use of the WiFi carrier when the WiFi carrier is selected. In some embodiments, the method further includes effectuating, at the base station, a handoff of the user equipment from the cellular radio network carrier to the WiFi network carrier. This may include establishing communication of a data flow between the base station and the user equipment on the cellular radio network carrier; establishing communication of the data flow between the base station and the user on the WiFi carrier; and discontinuing communication of the data flow between the base station and the user equipment on the cellular radio network carrier. In some embodiments, the method further includes, when the WiFi carrier is selected, effectuating, at the base station, a hand off of the user equipment from the selected WiFi carrier to a second WiFi carrier. In some embodiments, the method further includes, when the WiFi carrier is selected, transmitting, from the base station to a backhaul connection using a first protocol, data received on the selected WiFi carrier. When the cellular radio network carrier is selected, the method includes transmitting, from the base station to the backhaul connection using the first protocol, data received on the selected cellular radio network carrier.

According to another aspect, the invention provides a base station that includes a memory, a first cellular radio subsystem, a first WiFi radio subsystem and a scheduler. The memory is configured to store data to be transmitted to a user equipment. The first cellular radio subsystem is configured to transmit data flows on cellular radio network carriers, where the data flows include at least some of the data to be transmitted to the user equipment. The first WiFi radio subsystem is configured to transmit data flows on WiFi carriers. The scheduler is configured to select at least one of a cellular radio network carrier and a WiFi carrier upon which to transmit a data flow to the user equipment. The scheduler is further configured to cause at least one of the cellular radio subsystem and the WiFi radio subsystem to transmit a control signal to the user equipment. The control signal identifies at least one of a second cellular radio subsystem and a second WiFi subsystem of the user equipment to receive a transmitted data flow.

According to this aspect, in some embodiments, the scheduler is further configured to, when the WiFi carrier is selected, transmit data received on the selected WiFi carrier by the WiFi radio subsystem to a backhaul connection in a first protocol. The scheduler is further configured to, when the cellular radio carrier is selected, transmit data received on the selected cellular radio carrier by the cellular radio subsystem to the backhaul in the first protocol. In some embodiments, the base station further comprises an adaptation unit to convert data received on the selected WiFi carrier to the first protocol. In some embodiments, the scheduler is further configured to effectuate a handoff of the user equipment from the selected cellular radio network carrier to one of the WiFi carriers. In some embodiments, the scheduler is further configured to effectuate a handoff of the user equipment from the one of the WiFi carriers to a second one of the WiFi carriers. In some embodiments, the scheduler is further configured to meter use of the selected WiFi carrier. In some embodiments, the base station further includes an adaptation unit to convert data carried on the selected WiFi carrier to a different protocol before transmitting the data on a backhaul connection. In some embodiments, the selecting of at least one of the cellular radio network carrier and the WiFi carrier is based on a quality of service, QoS, associated with the cellular radio network carrier and a QoS of the WiFi carrier. In some embodiments, the selecting of at least one of the cellular radio network carrier and the WiFi carrier is based on a capacity of the cellular radio network carrier and a capacity of the WiFi carrier.

According to another aspect, the invention provides a user equipment having a memory, a cellular radio subsystem, a WiFi radio subsystem and a processor. The memory is configured to store a control signal received from a base station. The cellular radio subsystem configured to receive data carried by a cellular radio network carrier. The WiFi radio subsystem is configured to receive data carried by a WiFi carrier. The processor includes a switch that is configured to select at least one of the cellular radio subsystem and the WiFi radio subsystem to receive data carried by a corresponding carrier based on the control signal received from the base station. In some embodiments, the user equipment further includes an adaptation unit to adapt data on the WiFi carrier to a protocol useable by an application program of the user equipment.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
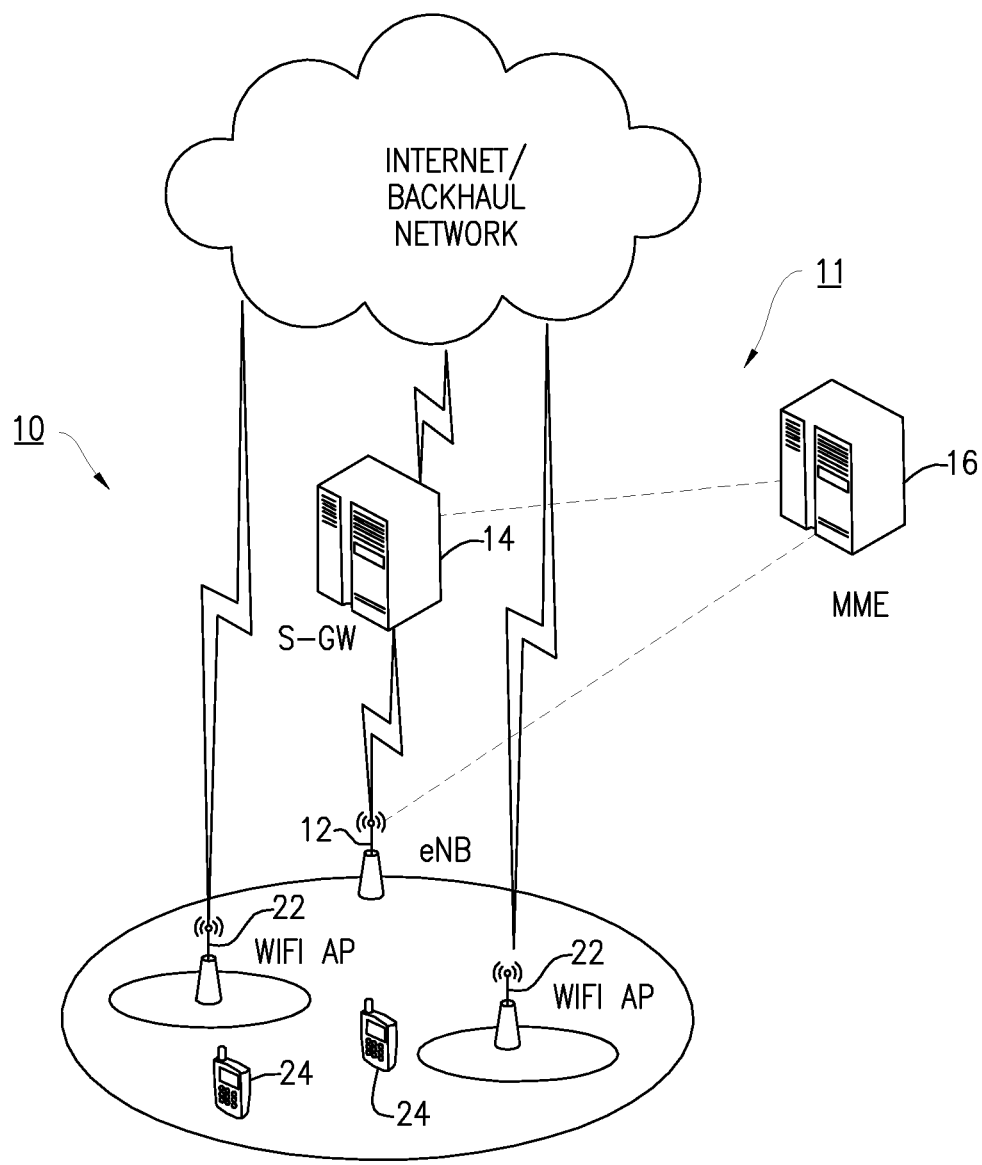
FIG. 1 is a diagram of a known cellular radio network and a known WiFi network.

Before describing in detail exemplary embodiments that are in accordance with the present invention, it is noted that the embodiments reside primarily in combinations of apparatus components and processing steps related to aggregation of carriers of a cellular radio network with carriers of a WiFi network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Of note, although the description herein references cellular radio and WiFi, the invention is not limited to such. It is contemplated that unlicensed or licensed communication technologies can be used for one or both of the cellular radio and WiFi technologies described herein.

As used herein, relational terms, such as "first" and "second," "top" and "bottom," and the like, may be used solely to distinguish one entity or element from another entity or element without necessarily requiring or implying any physical or logical relationship or order between such entities or elements.

Since one of the motivations of supplementing cellular radio network capacity with WiFi is to autonomously offload data traffic, it is desirable to manage QoS and capacity and to meter traffic pushed to the WiFi network so that terms of service level agreements can be met. Further, it is desirable to enable WiFi carriers to benefit from cellular radio mobility algorithms to provide mobility in the WiFi network. Although the embodiments described herein are with reference to LTE and WiFi networks, the principles of the invention are applicable to other licensed cellular radio systems and unlicensed systems. The unlicensed or licensed system which is used to supplement the capacity of the cellular radio system is referred to herein as an auxiliary radio network. In other words, the auxiliary radio network as used herein is the network other than the primary network and is used to supplement the primary cellular-based network.

Embodiments described herein enable a base station of a cellular radio network to allocate and control information flows allocated to an auxiliary radio network. This is achieved by locating a switch function in the user equipment that is controlled by the base station. Billing for traffic pushed to the auxiliary network is achieved by encapsulating the network facing interface of the auxiliary radio network within the existing interface between the cellular radio network and the backhaul network. Mobility of user equipment devices connected to the auxiliary radio network are controlled by mobility and handoff applications of the cellular radio network.

Figure 2:
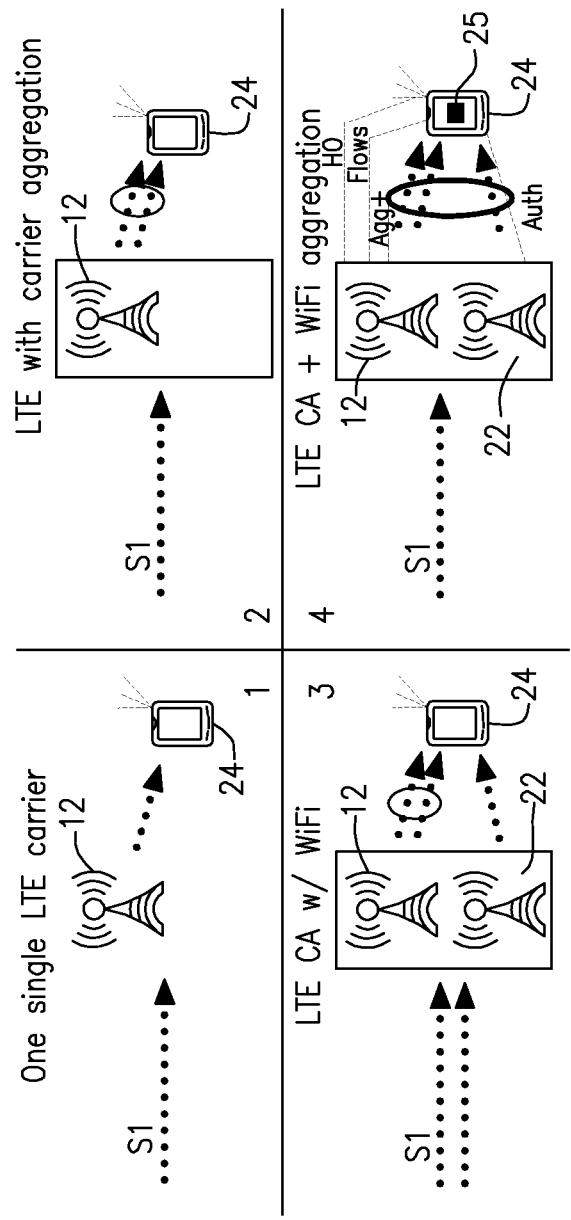
FIG. 2 is a diagram of an evolution of cellular radio networks and WiFi network culminating in the present invention.

Referring again to the drawing features, FIG. 2 is a diagram of an evolution of LTE and WiFi networks culminating in the aggregation of LTE and WiFi described herein. Quadrant 1 shows a single LTE carrier based evolved node B, eNB, 12 in communication with a user equipment 24 over a single LTE carrier. Quadrant 2 shows a single eNB 12 providing communication with a single user equipment 24 over a plurality of carriers to provide a higher quality of service and increased capacity to the user equipment. Quadrant 3 shows an eNB 12 in communication with the user equipment 24 over a plurality of carriers, as in Quadrant 2. Additionally, an independent WiFi access point 22 provides WiFi communication with the user equipment 24. Note that the eNB 12 is connected to a backhaul network using an S1 interface, whereas the WiFi access point 22 is connected to the backhaul network using a separate interface.

Quadrant 4 shows one embodiment of the present invention. In Quadrant 4 the carriers of the eNB 12 and the WiFi access point 22 are aggregated for communication with the user equipment 22. The WiFi access point 22 is subordinate to the eNB 12. In addition, a single S1 interface is provided to the backhaul network to carry communications of the cellular radio network and the WiFi radio network. Adaptations are made in the eNB 12 to make the WiFi carrier appear, and be managed as, an LTE carrier. Indicated by the vertical dotted line between the eNB 12 and the WiFi access point 22, there is coordination within the eNB that merges the control and traffic of the WiFi interface with the LTE interface. Indicated by the ellipse, the eNB 12 performs aggregation of the LTE and WiFi carriers. This may result in load balancing and QoS improvement to the user equipment 24. Indicated by the unit 25 in the user equipment 24, there is an adaptation to enable the user equipment 24 to be controlled by the eNB. The user equipment 24 is adapted so that the user equipment 24 no longer decides which air interface to use, as this is now decided by the eNB 12. Further, handoff measurements performed by the user equipment 24 are performed as part of its LTE functions. However, handoff between an LTE carrier and a WiFi carrier, or between WiFi carriers, is controlled by the eNB 12. In this way, the WiFi network inherits the mobility features of the LTE network.

Figure 3:
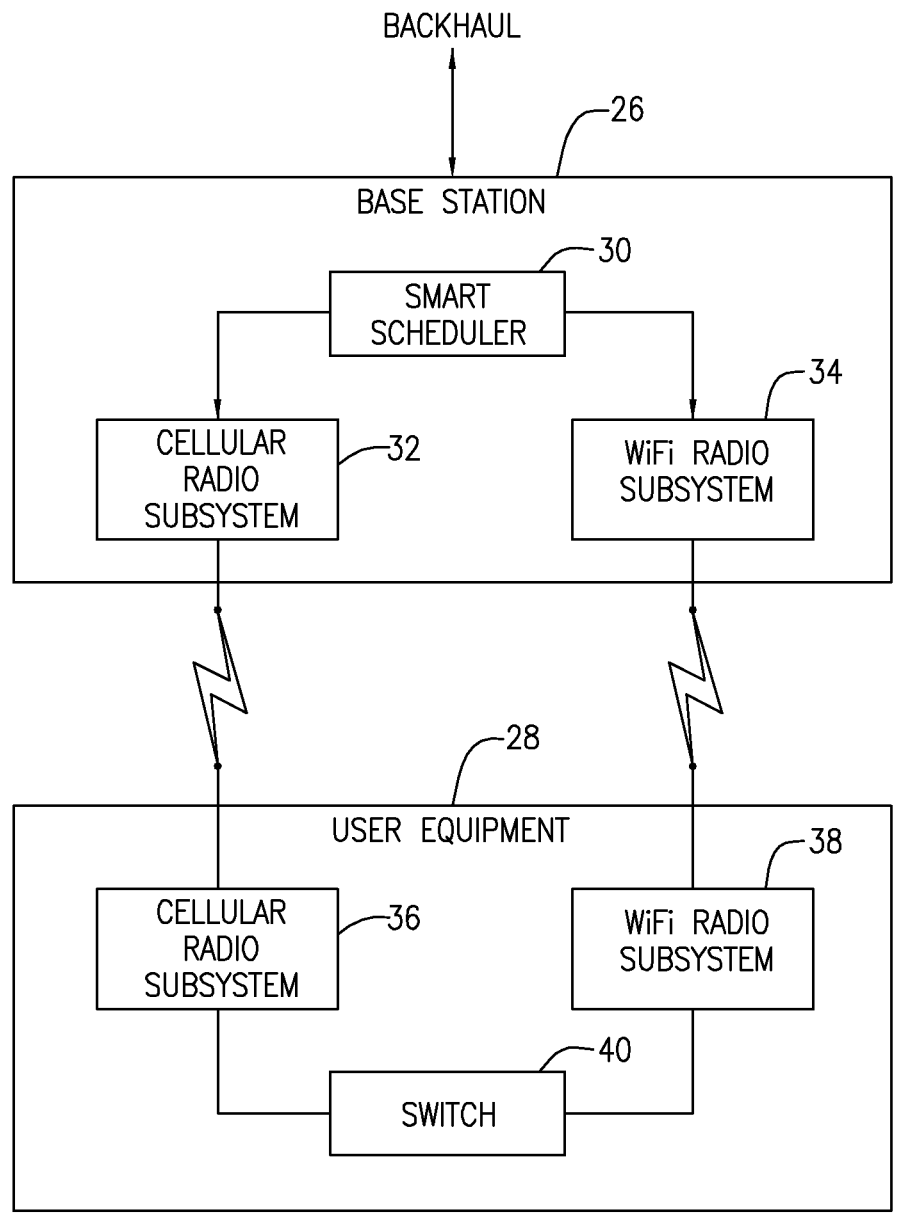
FIG. 3 is a block diagram of a base station and user equipment constructed in accordance with principles of the present invention.

FIG. 3 is a block diagram of an embodiment of a base station 26 and a user equipment 28 constructed in accordance with principles of the present invention. The base station 26 has a smart scheduler 30, a cellular radio subsystem 32 and a WiFi radio subsystem 34. The user equipment 28 has a cellular radio subsystem 36, a WiFi radio subsystem 38 and a smart switch 40. The cellular radio subsystem 32 and the cellular radio subsystem 36 communicate with each other using carriers of a cellular radio network. Similarly, the WiFi radio subsystem 34 and the cellular radio subsystem 38 communicate with each other using carriers of the WiFi network.

In the base station 26, the smart scheduler 30 decides based on carrier capacities, carrier loading, desired QoS, and mobility events (handoff), which carrier type—cellular radio or WiFi—will be used for a flow of information. The smart scheduler 30 controls the smart switch 40 of the user equipment 28 to cause the user equipment 28 to utilize one of the cellular radio subsystem 36 and the WiFi radio subsystem 38, for communication depending upon which carrier type is selected by the smart scheduler 30 of the base station 26.

The smart switch 40 of the user equipment 28 causes consolidation of a flow's payload over the selected carrier type. In order for flows to be switched from one carrier type to the other without disruption, the packets may need to be reordered and a retry mechanism may be implemented. This is because switching carriers may involve temporarily sending payloads on both carriers for a short duration to reduce a likelihood of missed packets.

As the user equipment 28 moves through the cellular radio network, the user equipment 28 may be handed off from one cellular radio network carrier to another cellular radio network carrier, from one WiFi carrier to another WiFi carrier, from a WiFi carrier to a cellular radio network carrier, or from a cellular network radio carrier to a WiFi carrier.

Figure 4:
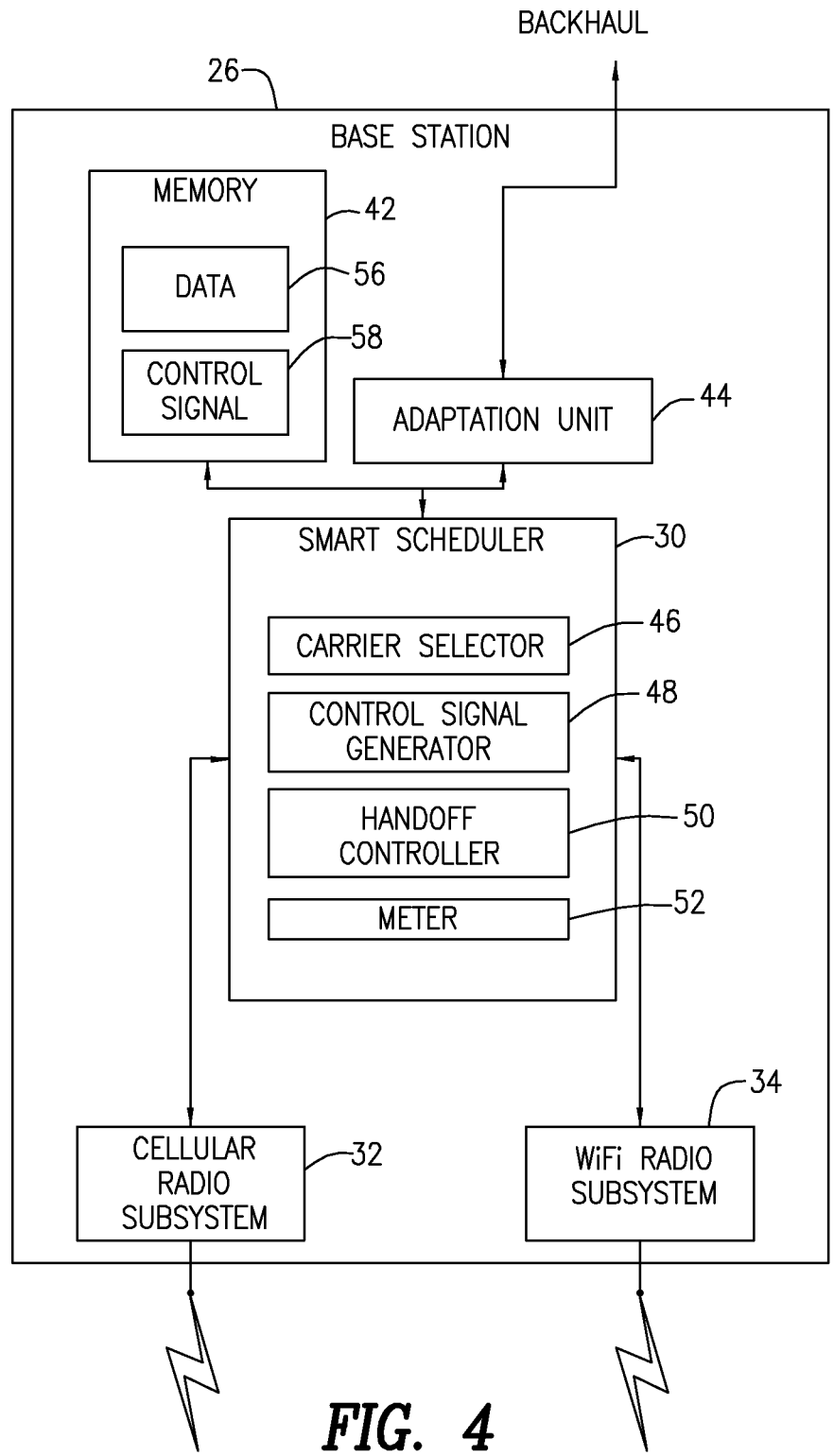
FIG. 4 is a more detailed block diagram of the base station of FIG. 3.

FIG. 4 is a more detailed view of the base station 26, which, in addition to the smart scheduler 30, cellular radio subsystem 32 and the WiFi radio subsystem 34, has a memory 42 and an adaptation unit 44. The memory 42 stores data 56 and control signal information 58. The data 56 may include information concerning carrier capacity and loading for the cellular radio network carriers and for the WiFi carriers, as well as QoS information. The control signal information 56 may include information concerning which carrier types are selected for different user equipment. The adaptation unit 44 converts information received on a WiFi carrier to an interface, such as an S1/X1 interface, between the base station 26 and the backhaul network. Thus, when a WiFi carrier is selected, data may be transmitted to a backhaul network using a first protocol, such as TCP/IP, and when a cellular radio network carrier is selected, data may be transmitted to the backhaul network also using the first protocol.

The smart scheduler 30 includes a carrier selector 46, a control signal generator 48, a handoff controller 50, and an optional meter 52. The carrier selector 46 selects one or more carriers from one of a cellular radio carrier group and a WiFi carrier group by which to communicate with a user equipment 28. Thus, for example, the carrier selector may select two cellular radio carriers and one WiFi carrier to communicate with the user equipment 28. The control signal generator 48 generates a control signal that is transmitted to a user equipment 28 to instruct a smart switch in a user equipment to cause selection of a radio subsystem to receive and transmit based on the carrier type selected by the carrier selector 46.

The handoff controller 50 functions to handoff an information flow associated with a particular user equipment from one carrier to another carrier, for example from one cellular radio network carrier to another cellular radio network carrier, from one WiFi carrier to another WiFi carrier, or between a cellular radio network carrier and a WiFi carrier. The handoff controller 50 determines what handoff to make based on handoff factors such as carrier capacities, carrier loading and quality of service experienced by the user equipment on either or both of a cellular radio network carrier and a WiFi carrier. An optional meter 52 monitors information flow rates on the selected carriers for billing purposes. In this way, information flow on a WiFi carrier can be metered and billed just as an information flow on a cellular radio network carrier is metered and billed. The metering function can also be provided in the gateway 14.

Figure 5:
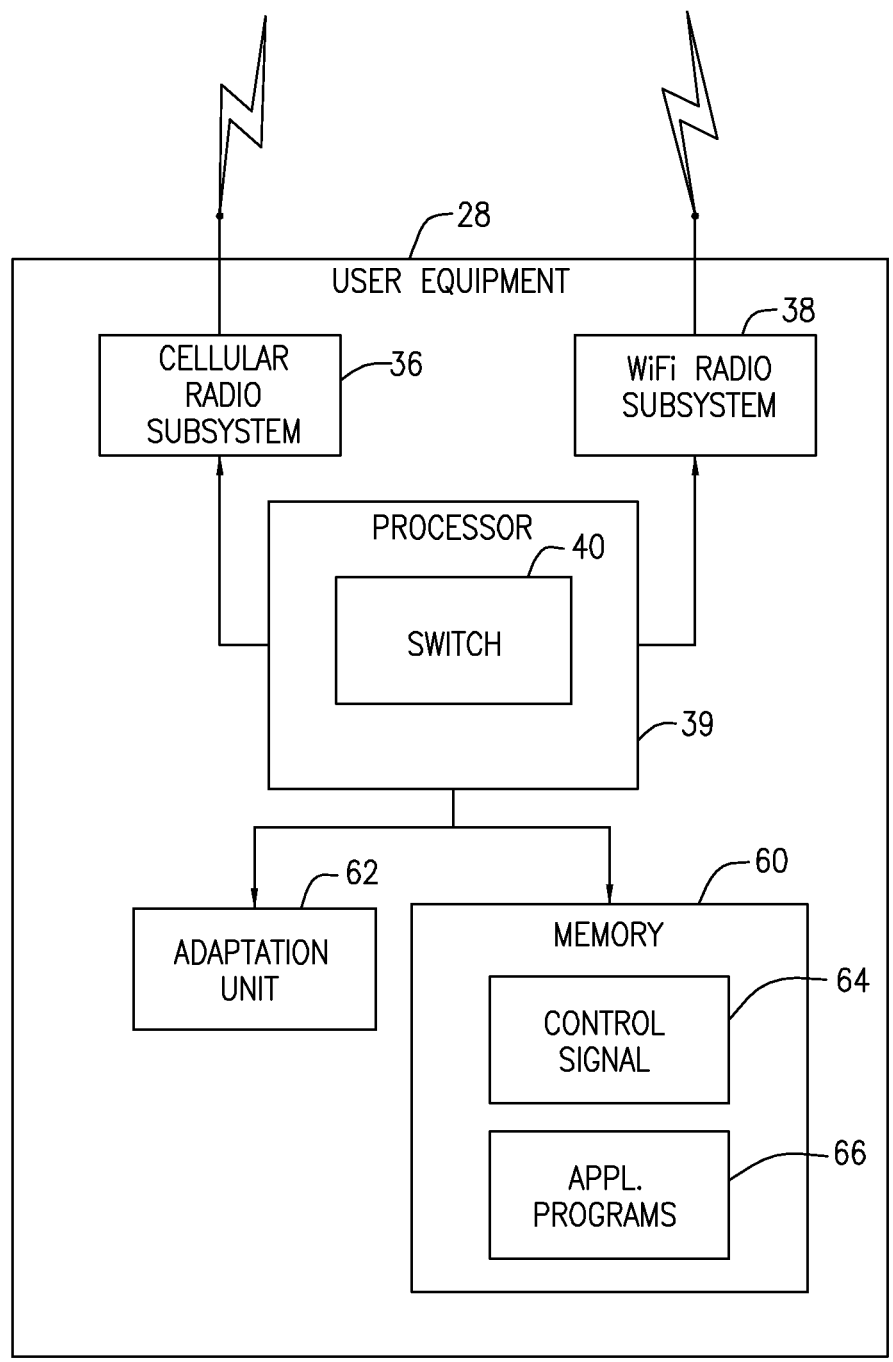
FIG. 5 is a more detailed block diagram of the user equipment of FIG. 3.

FIG. 5 is a more detailed block diagram of a user equipment 28, which, in addition to the cellular radio subsystem 36, the WiFi radio subsystem 38, and the smart switch 40, includes a processor 39, a memory 60, and an adaptation unit 62. The processor 39, operating under the direction of software, may perform the functions of the smart switch 40, i.e., to switch between use of the cellular radio subsystem 36 and the WiFi subsystem 38. In an alternative embodiment, the switch may be implemented by hardware separate from a processor. The memory 60 may include control switch information 64 which indicates what carrier type is to be employed for an information flow between the user equipment 28 and the base station 26. The memory 60 may also include application programs 66 of the user equipment 28. The adaption unit 62 functions to adapt data on the WiFi carrier to a protocol useable by an application program 66 of the user equipment.

In some embodiments, the smart switch 40 may be configured to respond to an instruction to simultaneously enable operation on a cellular radio network carrier and operation on a WiFi network. For example. The user equipment may be directed to operate on the cellular radio network carrier to receive delay intolerant audio and, at the same time, be directed to operate on the WiFi carrier to receive delay tolerant web-page data received from the Internet. Further, in some embodiments, handoff between a WiFi carrier and a cellular network carrier may be performed at one or more times during a session, based on for example, best efforts to maintain a quality of service, QoS, as continuously monitored by the base station 26.

In some embodiments, the base station 26 may be aware of a user equipment that has only WiFi capability. In these embodiments, the base station 26 will only assign such a user equipment to a WiFi carrier only. Further, in some embodiments, a user equipment may have good LTE coverage from one base station, but may have better WiFi coverage from another base station. In this situation, the user equipment may be handed off to the base station where WiFi coverage is better.

Figure 6:
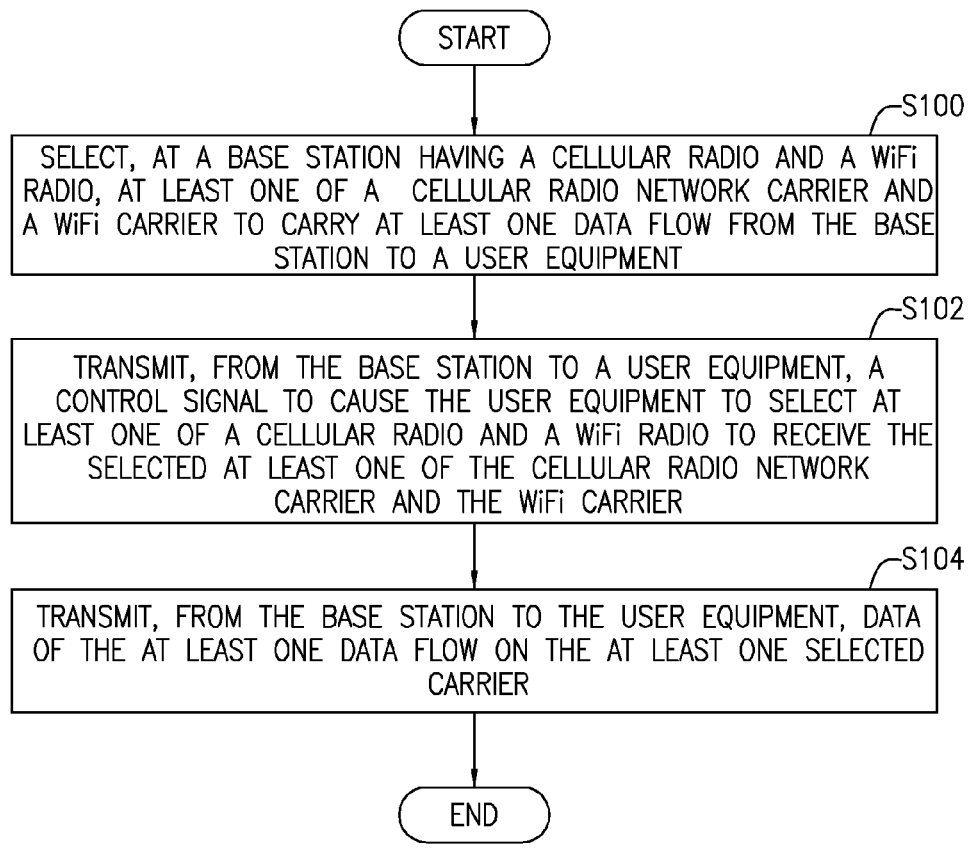
FIG. 6 is a flowchart of an exemplary process for selecting and using a carrier type from the perspective of the base station.

FIG. 6 is a flowchart of an exemplary process for selecting and using a carrier type from the perspective of the base station 26. At the base station 26, at least one of a cellular radio network carrier and a WiFi carrier is selected to carry at least one data flow between the base station 26 and the user equipment 28 (block S100). The selection of the carriers may be based at least in part on at least one of a quality of service, QoS, associated with flow of data that may be carried on the WiFi carrier or on the cellular radio network carrier, a capacity on the cellular radio network carrier, a capacity of the WiFi carrier, and a delay tolerance of data to be transmitted on the selected carrier. For example, video data may be less delay intolerant than web-based data. Consequently, an LTE carrier may be chosen for video data, whereas a WiFi carrier may be chosen for web-based data.

The base station 26 transmits a control signal to the user equipment 28 to cause the user equipment 28 to select one or the other of the cellular radio subsystem 36 and the WiFi radio subsystem 38 corresponding to the selected carrier type to communicate with the base station 26 (block S102). Then, the base station 26 transmits data of at least one data flow to the user equipment 28 on the selected carrier (block S104).

Figure 7:
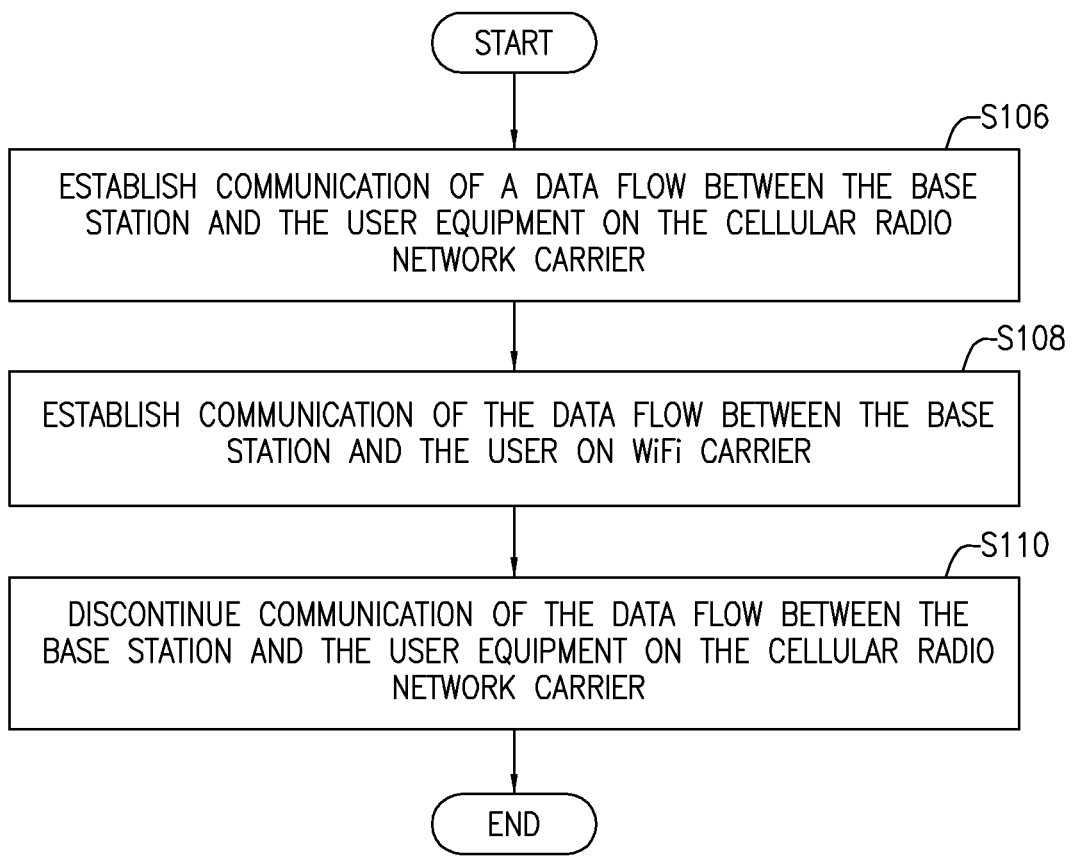
FIG. 7 is a flowchart of an exemplary process for handing off an information flow from a cellular radio network carrier to a WiFi carrier.

FIG. 7 is a flowchart of an exemplary process for handing off an information flow from a cellular radio network carrier to a WiFi carrier. Initially communication is established between a base station 26 and a user equipment 28 on a cellular radio network carrier (block S106). Prior to handoff, communication between the base station 26 and the user equipment 28 is established on a WiFi carrier (block S108). Once communication on the WiFi carrier is established, communication over the cellular radio network carrier may be discontinued (block S110). A decision whether to handoff a user equipment from one carrier to another may be based on carrier capacities, carrier loading and QoS.

Figure 8:
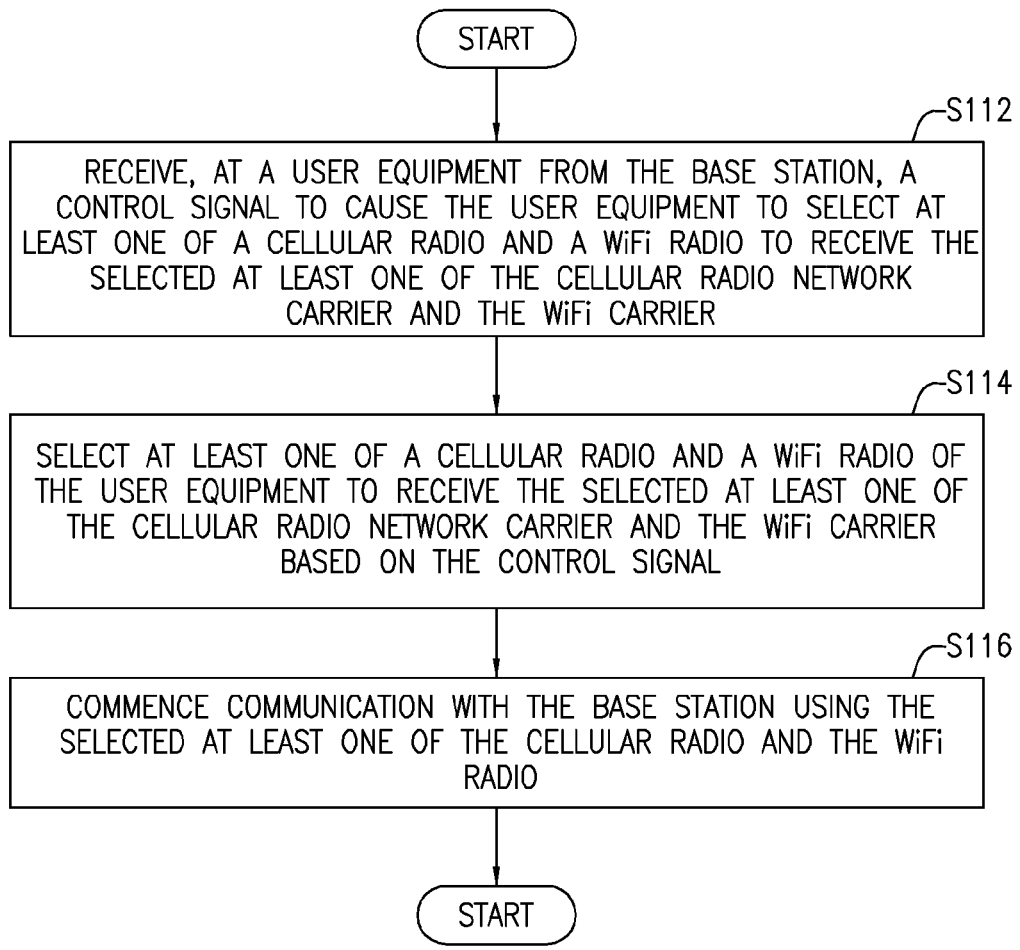
FIG. 8 is a flowchart of an exemplary process for selecting and using a carrier type from the point of view of a user equipment.

FIG. 8 is a flowchart of an exemplary process for selecting and using a carrier type from the point of view of a user equipment. The user equipment 28 receives a control signal from the base station 26 to cause the user equipment 28 to select at least one of a cellular radio subsystem 36 and a WiFi radio subsystem 38 to receive at least one of a cellular network carrier and WiFi carrier (block S112). In response to receiving the control signal, the user equipment 28 selects the indicated at least one of the cellular radio subsystem 36 and a WiFi radio subsystem 38 to communicate with the base station 26 (block S114). The user equipment then communicates with the base station using the selected one of the at least one of the cellular radio subsystem 36 and the WiFi radio subsystem 38 (block S116). In some embodiments, an adaptation unit in the user equipment 28 adapts data of the WiFi carrier to a protocol useable by an application program of the user equipment designed to operate in the cellular radio network.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of selecting between a primary network and an auxiliary network at a base station comprising a primary radio subsystem and an auxiliary radio subsystem, the method comprising:
   selecting one of a primary radio network carrier and an auxiliary radio network carrier to carry at least one data flow from the base station to a user equipment;
   transmitting, to a user equipment, a control signal to cause the user equipment to select one of a primary radio subsystem of the user equipment and an auxiliary radio subsystem of the user equipment to receive the selected carrier; and
   transmitting, to the user equipment, the at least one data flow on the selected carrier.

2. The method of claim 1, wherein selecting one of the primary radio network carrier and the auxiliary radio network carrier is based at least in part on a quality of service, QoS, associated with transmission of data on the auxiliary radio network carrier.

3. The method of claim 1, wherein selecting one of the primary radio network carrier and the auxiliary radio network carrier is based at least in part on a capacity of the auxiliary radio network carrier.

4. The method of claim 1, wherein selecting one of the primary radio network carrier and the auxiliary radio network carrier is based at least in part on a delay tolerance of data to be transmitted.

5. The method of claim 1, further comprising metering, at the base station, use of the auxiliary radio network carrier when the auxiliary radio network carrier is selected.

6. The method of claim 1, further comprising effectuating, at the base station, a handoff of the user equipment from the primary radio network carrier to the auxiliary radio network carrier.

7. The method of claim 6, wherein effectuating the handoff of the user equipment from the primary radio network carrier to the auxiliary radio network carrier comprises:
   establishing communication for the at least one data flow between the base station and the user equipment on the auxiliary radio network carrier; and
   discontinuing communication for the at least one data flow between the base station and the user equipment on the primary radio network carrier.

8. The method of claim 1, wherein the primary radio subsystem is based on a licensed communication technology and the auxiliary radio subsystem is based on an unlicensed communication technology.

9. A base station comprising:
   a primary radio subsystem configured to transmit data flows on primary radio network carriers;
   an auxiliary radio subsystem configured to transmit data flows on auxiliary radio network carriers; and
   the base station being configured to:
      select one of a primary radio network carrier and an auxiliary radio network carrier to carry at least one data flow from the base station to a user equipment;
      transmit a control signal to the user equipment, the control signal identifying one of a primary radio subsystem of the user equipment and an auxiliary radio subsystem of the user equipment to receive the at least one data flow on the selected carrier; and
      transmit the at least one data flow to the user equipment on the selected carrier.

10. The base station of claim 9, wherein the base station is further configured to select one of the primary radio network carrier and the auxiliary radio network carrier based at least in part on a quality of service, QoS, associated with transmission of the at least one data flow on the auxiliary radio network carrier.

11. The base station of claim 9, wherein the base station is further configured to select one of the primary radio network carrier and the auxiliary radio network carrier based at least in part on a capacity of the auxiliary radio network carrier.

12. The base station of claim 9, wherein the base station is further configured to select one of the primary radio network carrier and the auxiliary radio network carrier based at least in part on a delay tolerance of the at least one data flow to be transmitted.

13. The base station of claim 9, wherein the base station is further configured to meter use of the auxiliary radio network carrier when the auxiliary radio network carrier is selected.

14. The base station of claim 9, wherein the base station is further configured to effectuate a handoff of the user equipment from the primary radio network carrier to the auxiliary radio network carrier.

15. The base station of claim 14, wherein the base station is further configured to:
   establish communication for the at least one data flow between the base station and the user equipment on the auxiliary radio network carrier; and
   discontinue communication for the at least one data flow between the base station and the user equipment on the primary radio network carrier.

16. The base station of claim 9, wherein the primary radio subsystem is based on a licensed communication technology and the auxiliary radio subsystem is based on an unlicensed communication technology.

17. A method of selecting between a primary network and an auxiliary network at a user equipment comprising a primary radio subsystem and an auxiliary radio subsystem, the method comprising:
   receiving, from a base station, a control signal comprising an instruction to select one of the primary radio subsystem and the auxiliary radio subsystem to receive one of a primary radio network carrier and an auxiliary radio network carrier selected by the base station to carry at least one data flow;
   selecting one of the primary radio subsystem and the auxiliary radio subsystem to receive the selected carrier based on the received control signal; and
   receiving the at least one data flow from the base station on the selected carrier.

18. The method of claim 17, further comprising:
   establishing communication for the at least one data flow between the base station and the user equipment on the auxiliary radio network carrier; and
   discontinuing communication for the at least one data flow between the base station and the user equipment on the primary radio network carrier.

19. The method of claim 17, wherein the primary radio subsystem is based on a licensed communication technology and the auxiliary radio subsystem is based on an unlicensed communication technology.

20. A user equipment comprising:
a primary radio subsystem configured to receive data flows carried by primary radio network carriers;
an auxiliary radio subsystem configured to receive data flows carried by auxiliary radio network carriers; and
the user equipment being configured to:
  receive, from a base station, a control signal comprising an instruction to select one of the primary radio subsystem and the auxiliary radio subsystem to receive one of a primary radio network carrier and an auxiliary radio network carrier selected by the base station to carry at least one data flow;
  select one of the primary radio subsystem and the auxiliary radio subsystem to receive the selected carrier based on the received control signal; and
  receive the at least one data flow from the base station on the selected carrier.

21. The user equipment of claim 20, further configured to:
establish communication for the at least one data flow between the base station and the user equipment on the auxiliary radio network carrier; and
discontinue communication for the at least one data flow between the base station and the user equipment on the primary radio network carrier.

22. The user equipment of claim 20, wherein the primary radio subsystem is based on a licensed communication technology and the auxiliary radio subsystem is based on an unlicensed communication technology.

* * * * *

UNITED STATES PATENT AND TRADEMARK OFFICE
CERTIFICATE OF CORRECTION

PATENT NO. : 9,301,227 B2  
APPLICATION NO. : 14/629857  
DATED : March 29, 2016  
INVENTOR(S) : Comeau Page 1 of 1

It is certified that error appears in the above-identified patent and that said Letters Patent is hereby corrected as shown below:

Drawings

In Fig. 8, Sheet 8 of 8, Found below box S116 delete " 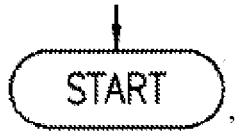 " and insert -- 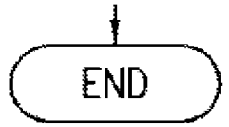 --, therefor.

Specification

In Column 7, Line 42, delete "example. The" and insert -- example, the --, therefor.

Signed and Sealed this  
Nineteenth Day of July, 2016

Michelle K. Lee  
*Director of the United States Patent and Trademark Office*